United States Patent [19]
Zitzlaff et al.

[11] Patent Number: 5,733,073
[45] Date of Patent: Mar. 31, 1998

[54] CUTTING TOOL ASSEMBLY AND CUTTING TOOL BIT

[75] Inventors: Wolfgang Zitzlaff, Graevenwiesbach; Max Cerny, Augsburg, both of Germany

[73] Assignee: Kennametal Inc., Latrobe, Pa.

[21] Appl. No.: 722,107

[22] PCT Filed: Mar. 15, 1995

[86] PCT No.: PCT/US95/03258

§ 371 Date: Feb. 21, 1997

§ 102(e) Date: Feb. 21, 1997

[87] PCT Pub. No.: WO95/26846

PCT Pub. Date: Oct. 12, 1995

[51] Int. Cl.$^6$ ................................................. B23B 17/16
[52] U.S. Cl. ........................... 407/107; 407/102; 407/113
[58] Field of Search .......................... 407/47, 66, 102, 407/107, 106, 111, 113

[56] References Cited

U.S. PATENT DOCUMENTS

| | | |
|---|---|---|
| 3,431,801 | 3/1969 | Stassart. |
| 4,414,870 | 11/1983 | Peterson .................................. 82/158 |
| 4,552,491 | 11/1985 | Parker ..................................... 407/107 |
| 5,100,269 | 3/1992 | Lyon et al. ............................. 407/107 |

FOREIGN PATENT DOCUMENTS

| | | |
|---|---|---|
| 1524276 | 5/1968 | France. |
| 4320409 | 12/1994 | Germany. |
| 271208 | 6/1927 | United Kingdom. |

*Primary Examiner*—Daniel W. Howell
*Assistant Examiner*—Mark Williams
*Attorney, Agent, or Firm*—John J. Prizzi

[57] ABSTRACT

A cutting tool assembly with a clamping mechanism for releasably clamping a tool bit (18) on a tool holder (10) is disclosed. The tool holder (10) defines an elongated planar seating surface (12) with a socket (14) on its forward end and a threaded bore (20) on its rear end. A further threaded bore (22) is provided in the seating surface intermediate the forward and rearward ends. A conical tool bit (18) forms a circular cutting edge (52) and has a shank (16) adapted to be received in the socket (14). An elongated bar-shaped clamping member (32) has one end engaging in a circumferential groove (28) of the tool bit (18). The opposite end of the clamping member (32) has arcuate concave surface portion (32b) for abutment with the conical surface on a tapered head (34) of an adjustment screw (36) engaged in the threaded bore (20) of the seating surface (12). A fastening screw (40) extends through an elongated hole (38) of the clamping member (32) and is engaged in the corresponding threaded bore (22) in the seating surface (12).

11 Claims, 3 Drawing Sheets

CUTTING TOOL ASSEMBLY AND CUTTING TOOL BIT

BACKGROUND OF THE INVENTION

The present invention relates to a cutting tool assembly and to a cutting tool bit for use therein.

Cutting tools suitable for precision cutting of grooves or profiling operations have a cutting bit with a cutting head projecting from a tool holder. In U.S. Pat. No. 1,542,007 a cutting tool with a conical bit accommodated in a socket of the tool holder is disclosed. The socket is formed by a tapered bore. The conical cutting bit has a circumferential groove, and a clamping screw engages in the groove to retain the cutting bit in its socket. The cutting bit has a circular cutting edge at the intersection of its top face and its conical side face. When the cutting edge presented to the workpiece is worn the tool bit can be revolved about its longitudinal axis to present a new cutting edge. Another cutting tool with a conical cutting bit is disclosed in U.S. Pat. No. 3,871,092. The tool bit has a bottom formed by two flat converging seating surfaces. A socket of corresponding shape is provided in the tool holder. The cutting bit is fastened to the tool holder by a top clamp engaging the planar top face of the bit.

SUMMARY OF THE INVENTION

The present invention provides a cutting tool assembly wherein the cutting bit has a cutting head freely projecting from the tool holder so that relatively deep cuts are possible without obstruction by the clamping arrangement. In accordance with the invention, the cutting tool assembly comprises a tool holder which defines an elongated seating surface with a socket on one longitudinal end, a threaded bore on the other end and a further threaded bore in an intermediate zone. The cutting tool bit has a cutting head portion and a shank adapted to be received in the socket of the tool holder. An elongated clamping member is provided which has an end portion provided with a tool engagement face. The other end portion of the clamping member is provided with an abutment face, and a preferably elongated through-hole is provided in an intermediate zone of the clamping member.

A fastening screw is adapted to extend through the hole in the clamping member and to be engaged in the corresponding threaded bore of the seating surface. An adjustment screw having a tapered head is adapted to be engaged in the threaded bore on the second longitudinal end of the seating surface. The tool bit has a side face with a circumferential groove therein. The corresponding end portion of the clamping member is adapted to engage into this groove, and the abutment face on the other end portion of the clamping member is adapted to bear on the tapered head of the adjustment screw. When the fastening screw is tightened, the clamping member is free to move both in a longitudinal direction and in the direction of the fastening screw for self-alignment between the tapered head surface of the adjustment screw and the surface of the groove in the tool bit. When the adjustment screw is rotated in a sense moving its tapered head away from the seating surface of the tool holder, the clamp is urged in a longitudinal direction towards the tool bit, thereby establishing a firm contact between the engagement face on the end portion of the clamping member and the corresponding, preferably conical surface of the groove in the tool bit.

Preferably, the clamping member has a convex projection on its side facing the seating surface of the tool holder between its end portion provided with the tool engagement face and its through hole. The convex projection bears on the seating surface of the tool holder and permits a rocking movement of the clamping member. This rocking movement of the clamping member contributes to an optimum self-alignment of the contacting faces between the clamping member on the one hand and the groove of the tool bit and the tapered head of the adjustment screw on the other hand.

In the preferred embodiment, the fastening screw has a head portion and a peripheral groove spaced from the head portion and a clip is engaged in the groove to retain the fastening screw on the clamping member. When the fastening screw is released, the bit abuts the adjacent face of the clamping member, which is then lifted away from the seating surface of the tool holder. Simultaneously, the clamping member is disengaged from the groove of the tool bit, which is thus released and can be rotated or indexed in the socket of the tool holder or can be replaced in case of need.

In a preferred embodiment, the cutting tool bit has a cutting head portion with a truncated cone-shaped side face which is defined by a top face and a peripheral groove. The tool bit has a shank and a radial flange between the groove and the shank. The radial flange forms a radial seating surface, and the groove is partially defined on its side adjacent the flange by a truncated cone-shaped side face. A circular cutting edge is formed at the intersection of the top face and the side face.

Further objects and features of the invention will become apparent from the following description and the accompanying drawings which are illustrative of the invention.

DETAILED DESCRIPTION OF THE INVENTION

Figure 1:
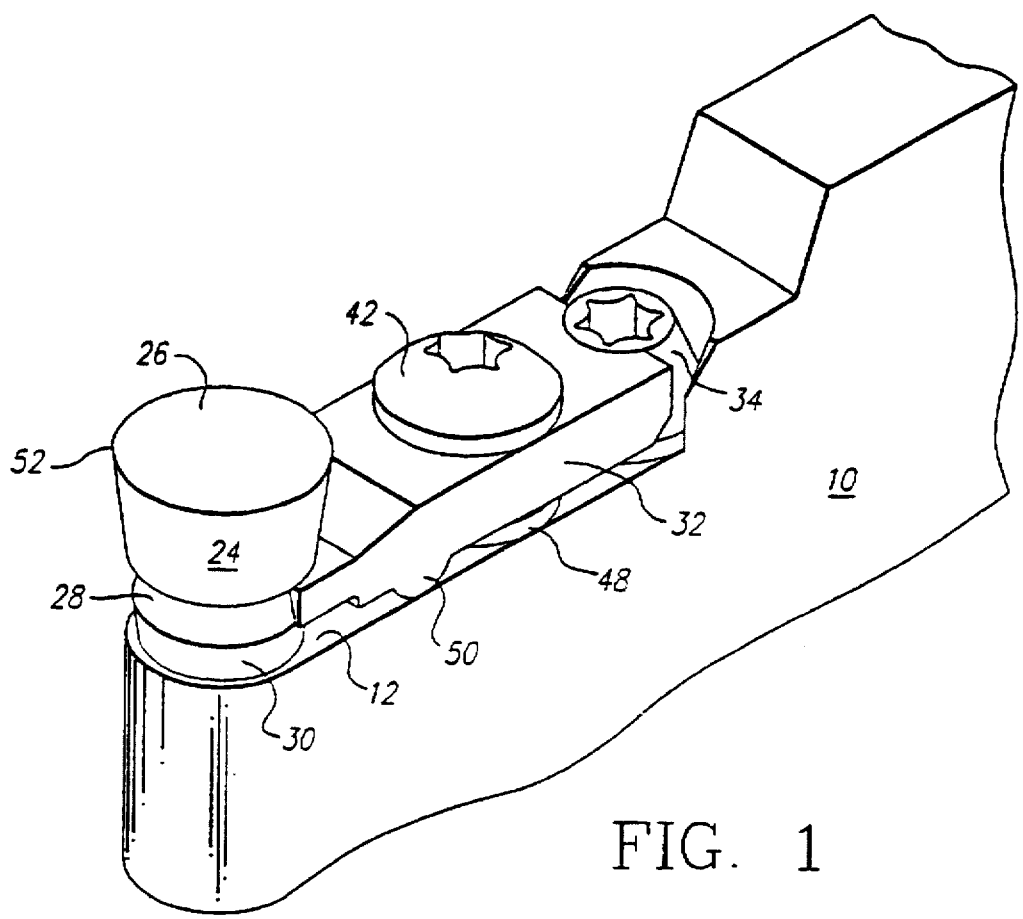
FIG. 1 is a perspective view of a cutting tool assembly with a conical tool bit.

The cutting tool assembly of the invention comprises an elongated tool holder 10 with a recessed top forming an elongated planar seating surface 12. On its forward or front end the tool holder 10 is provided with a socket 14 for mating accommodation of the shank portion 16 of a tool bit 18. A threaded bore 20 is provided in the rear end portion of the seating surface 12. A further threaded bore 22 is formed in the seating surface 12 between the socket 14 and the threaded bore 20, but closer to the latter. The socket 14 and the threaded bores 20, 22 are aligned along the center line of the seating surface 12.

The tool bit 18 has a conical cutting head portion 24 which, more precisely, is of truncated cone-shape with the larger diameter on the side of its flat top face 26. The cutting head portion 24 is adjacent to a circumferential groove 28, and a radial flange 30 is provided adjacent the groove 28 between the latter and the shank 16. The groove 28 is defined by two intersecting and converging, conical, or truncated cone-shaped surface portions 28a and 28b.

Figure 4:
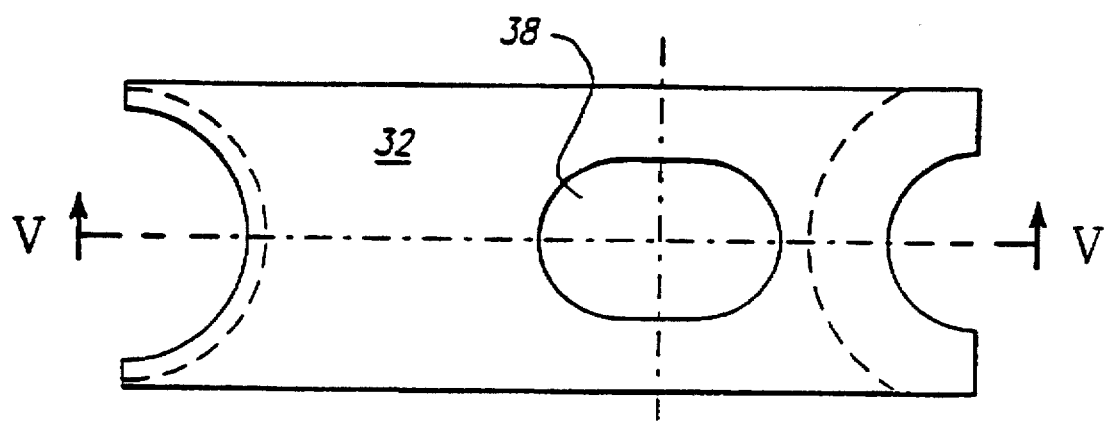
FIG. 4 is a plan view of a clamping member.
Figure 5:
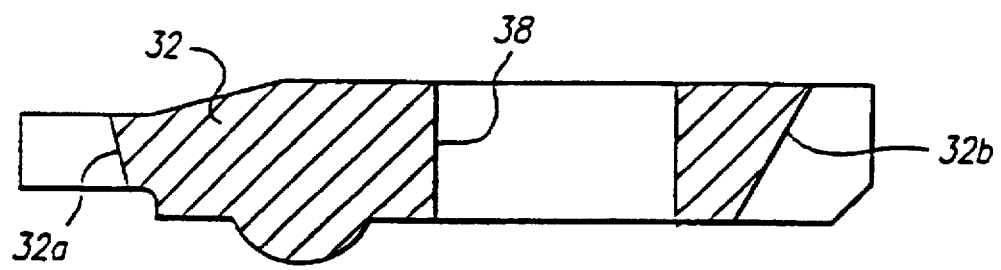
FIG. 5 is a sectional view of the clamping member along line V—V in FIG. 4.

An elongated bar-shaped clamping member 32 has a forward end of an arcuate concave shape when seen in top view (of. FIG. 4) and defines an inclined tool engagement face 32a corresponding in shape to the conical surface portion 28a of the groove 28. On its opposite rear end portion the clamping member 32 is formed with an arcuate concave surface portion 32b which is inclined in a direction opposite to that in which the tool engagement face 32a is inclined. The arcuate surface portion 32b is of a partially conical shape corresponding to the conical shape of a tapered head 34 of an adjustment screw 36. The threaded shank portion of the adjustment screw 36 is adapted to be engaged in the threaded bore 20.

The elongated clamping member 32 has an elongated through-hole 38 and a fastening screw 40 is 15 provided to extend through the hole 38 and to be engaged in the threaded bore 22. The fastening screw 40 has a head portion 42, a shank 44 and a radial circumferential groove 46 spaced from the head portion 42 at a distance somewhat greater than the thickness of the elongated, bar-shaped clamping member 32. A clip 48 can be engaged in the groove 46, so that in cooperation with the head portion 42, the fastening screw 40 is retained on the clamping member 32.

On its side facing the seating surface 12 the clamping member 32 is provided with a convex projection 50 located between the forward end portion and the through hole 38 of the clamping member. The convex projection 50 is adapted to engage the planar seating surface 12 to allow a rocking movement of the clamping member 32 about its line of contact on the seating surface 12. Nevertheless, the clamping member 32 is free to slide on the seating surface 12 in the longitudinal direction thereof.

Figure 3:
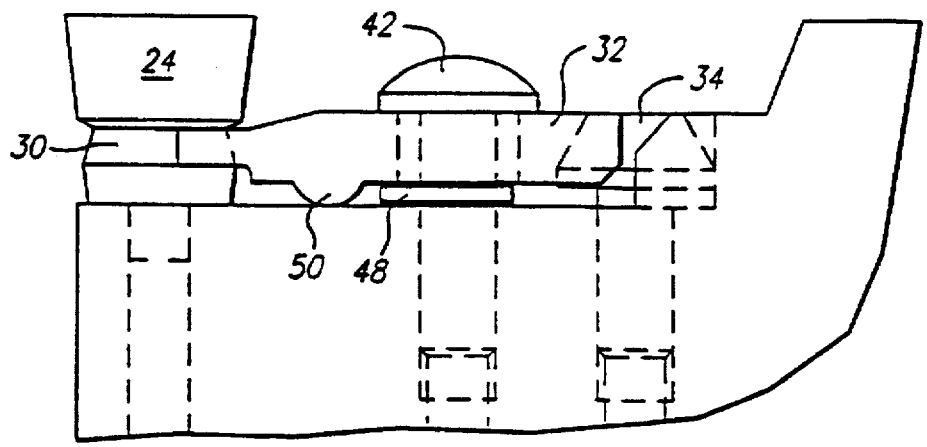
FIG. 3 is an elevational view of the assembly.

In the mounted state, as shown in FIGS. 1 and 3, the conical head portion 34 of the adjustment screw 36 projects above the seating surface 12 and the arcuate surface portion 32b forms an abutment face closely engaged on the conical surface portion of tapered head 34. On the opposite end of the clamping member 32, the arcuate tool engagement face 32a comes into close engagement with the conical surface portion 28a of the groove 28. The fastening screw 40 extends through the elongated hole 38 and is engaged in the threaded bore 22. When the fastening screw 40 is tightened, the convex projection 50 of the clamping member 32 is urged against the seating surface 12, and the arcuate surface portions 32a and 32b are wedged against the conical surface portion 28a of the groove 28 and the conical surface of the tapered head 34, respectively. By more or less raising the adjustment screw 36 above the seating surface 12, the wedging action between the arcuate surface portion 32b of the tool holder 32 and the conical surface portion on the tapered head 34 causes a longitudinal movement of the clamping member 32 in a direction towards the tool bit 18. Simultaneously, the tool engagement face 32a on the front end of the clamping member 32 is more firmly engaged with the conical surface portion 28a of the groove 28, so that the tool bit 18 is clamped against the seating surface 12, with the planar seating face on the lower side of the radial flange 30 contacting the corresponding portion of the seating portion 12 surrounding the socket 14. It is readily understood that the clamping mechanism of this invention permits self-alignment of the clamping member 32 with a uniform distribution of clamping forces. The clamping mechanism permits the cutting head portion 24 to project freely above the seating surface 12, thus permitting rather deep cuts of grooves or profiles.

When the circular cutting edge 52 formed at the intersection of the top face 26 and the conical side face of the head portion 24 is worn in its zone presented to a workpiece, the fastening screw 40 is released, and the tool bit 18 is rotated to a sufficient extent to present a new cutting edge portion to the workpiece. Thereafter, the fastening screw is tightened again. When the fastening screw 40 is released, the clip 48 engages beneath the clamping member 32, so that the tool engagement face 32a is positively lifted and withdrawn from the conical surface portion 28a of the groove 28.

The circumferential groove 28 also serves the purpose of forming a weakening in the structure of the tool bit 18. Should a collision occur unintentionally between the workpiece and the tool bit, the head piece of the tool bit is ruptured along the groove 28 and falls clear of the workpiece, thus preventing the tool bit from damaging the workpiece.

Figure 6:
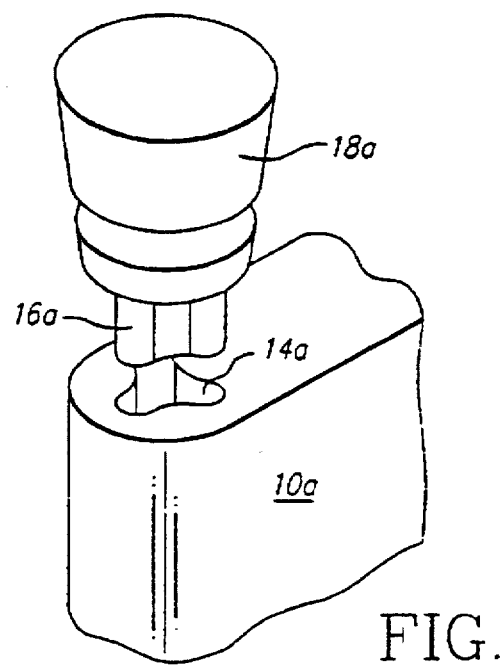
FIG. 6 is a perspective partial view of an alternative embodiment of a tool bit and seating socket on the tool holder.
Figure 2:
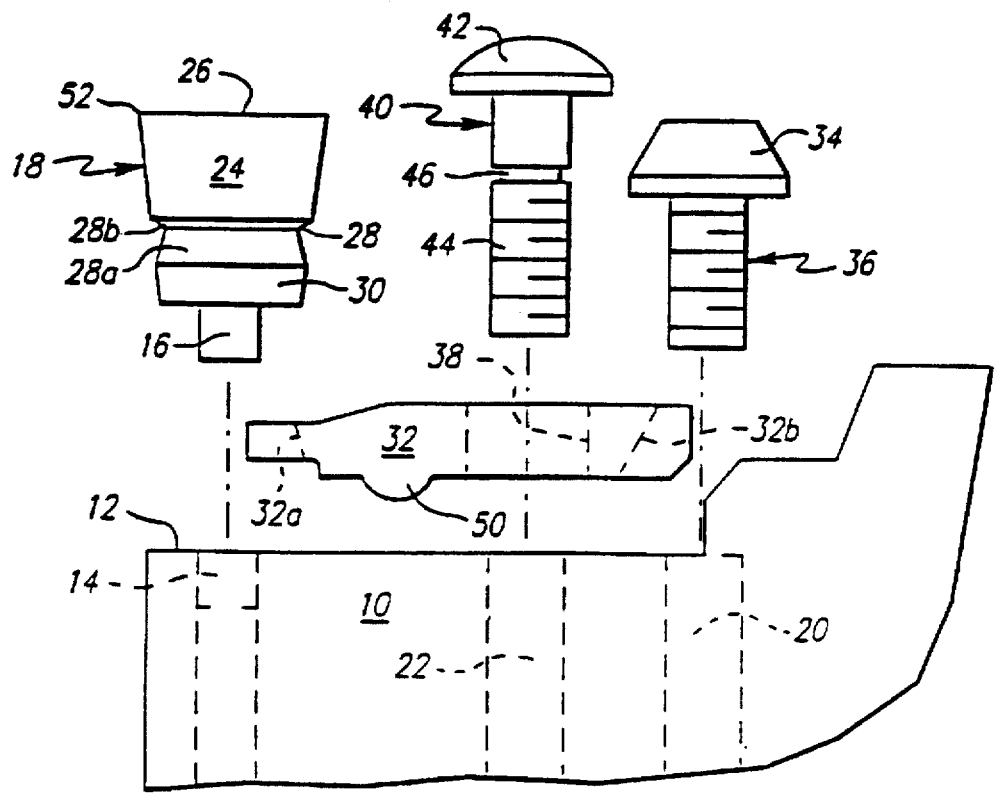
FIG. 2 is an elevational explosive view of the assembly shown in FIG. 1.

In the embodiment shown in FIG. 6, the tool bit 18a has a shank 16a formed with splines corresponding in shape to concave portions of the 20 socket 14a in the tool holder 10a. By mating engagement of the splines on the shank 16a in the corresponding concave portions of the socket 14a, the tool bit 18a is prevented from rotation in the socket 14a. In this embodiment, the tool bit 18a can be indexed by fixed amounts of e.g. 45° when a new cutting edge portion is required.

What is claimed is:

1. A cutting tool assembly comprising:
   a tool holder, (10) defining an elongated seating surface (12) with a socket (14) on a first longitudinal end, a first threaded bore (20) on a second longitudinal end and a second threaded bore (22) between said first and second longitudinal ends;
   a tool bit (18) having a cutting head portion (26) and a shank (16) adapted to be received in said socket (14);
   an elongated clamping member (32) having a first end portion provided with a tool engagement face (32a), a second end portion provided with an abutment face (32b) and a through-hole (38) between said first and second end portions;
   a fastening screw (40) adapted to extend through said through-hole (38) in said clamping member (32) and to be engaged in said second threaded bore (22);
   and an adjustment screw (36) having a tapered head (34) and adapted to be engaged in said first threaded bore (20);
   said tool bit (18) having a side face with a groove (28), said first end portion of said clamping member (32) being adapted to engage into said groove (28) and said abutment face (32b) on the second end portion of said clamping member 32 being adapted to bear on said tapered head (34) of said adjustment screw (36).

2. The assembly of claim 1, wherein said clamping member (32) has a convex projection (50) on its side facing said seating surface (12) between said first end portion and said second threaded bore (22).

3. The assembly of claim 1, wherein said abutment face (32b) on the second end portion of said clamping member (32) is shaped to correspond to the shape of said tapered head (34) of the adjustment screw (36).

4. The assembly of claim 1, wherein said groove (28) in the side face of said tool bit (18) is partially defined by a truncated cone-shaped surface (28a) and said tool engagement face (32a) on the second end portion of said clamping member (32) is shaped to correspond to said truncated cone-shaped surface (28a).

5. The assembly of claim 1, wherein said abutment face (32b) on the second end portion of said clamping member

(32) is shaped to correspond to the shape of said tapered head (34) of the adjustment screw (36), said groove (28) in the side face of said tool bit (18) is partially defined by a truncated cone-shaped surface (28a), said tool engagement face (32a) on the second end portion of said clamping member (32) is shaped to correspond to said truncated cone-shaped surface (28a) and said abutment (32b) and tool engagement faces (32a) are inclined in opposite directions.

6. The assembly of claim 1, wherein said tool bit (18) has a radial seating flange (30) between said groove (28) and said shank (16).

7. The assembly of claim 1, wherein said fastening screw (40) has a head portion (42), a circumferential groove (46) spaced from said head portion (42), and a clip (48) being engaged in said groove (46) to retain said fastening screw (40) on said clamping member (32).

8. The assembly of claim 1, wherein said cutting head portion (24) has a truncated cone-shaped side face with a smaller diameter on its side adjacent said groove (28) and a larger diameter on its top face (26), a circular cutting edge (52) being formed at the intersection of said top face (26) and said side face.

9. The assembly of claim 1, wherein said through-hole (38) in said clamping member (32) is elongated.

10. The assembly of claim 1, wherein said socket (14) and said tool bit shank (16) are provided with complementary splines to prevent rotation of said tool bit (18) on said tool holder (10).

11. A cutting tool bit (18) having a cutting head portion (24) with a truncated cone-shaped side face defined between a top face (26) and a peripheral groove (28) and a radial flange (30) between said groove (28) and a shank (16), said flange (30) having a cone-shaped surface portion (28a), said groove (28) being partially defined on its side adjacent to said flange (30) by a truncated cone-shaped face, and a circular cutting edge (52) being formed at the intersection of said top face (26) and said side face.

* * * * *